United States Patent
Boozer

(10) Patent No.: US 9,084,512 B2
(45) Date of Patent: Jul. 21, 2015

(54) BLENDER BASE

(75) Inventor: Richard D. Boozer, Wakeman, OH (US)

(73) Assignee: Vita-Mix Management Corporation, Olmsted Township, OH (US)

( * ) Notice: Subject to any disclaimer, the term of this patent is extended or adjusted under 35 U.S.C. 154(b) by 0 days.

(21) Appl. No.: 13/108,253

(22) Filed: May 16, 2011

(65) Prior Publication Data
US 2012/0294109 A1    Nov. 22, 2012

(51) Int. Cl.
*A47J 43/046*    (2006.01)
*A47J 43/07*    (2006.01)

(52) U.S. Cl.
CPC ................................. *A47J 43/0716* (2013.01)

(58) Field of Classification Search
CPC .... A47J 43/085; A47J 43/046; A47J 43/0716
USPC .......... 366/314, 205, 206; 241/199.12, 282.1, 241/282.2; 310/62, 63; 416/189, 192
See application file for complete search history.

(56) References Cited

U.S. PATENT DOCUMENTS

| | | | |
|---|---|---|---|
| 2,664,002 A * | 12/1953 | Anderson | 464/112 |
| 2,744,203 A * | 5/1956 | Collura | 310/91 |
| 2,778,958 A * | 1/1957 | Hamm et al. | 310/57 |
| 2,822,123 A * | 2/1958 | Cole | 417/423.2 |
| RE24,607 E * | 2/1959 | Seyfried | 192/55.2 |
| 2,913,230 A * | 11/1959 | Hutchins | 241/282.2 |
| 3,064,949 A * | 11/1962 | Dewenter | 241/195 |
| 3,137,327 A * | 6/1964 | Muench | 141/172 |
| 3,172,441 A * | 3/1965 | Hartwig et al. | 241/282.1 |
| 3,220,450 A * | 11/1965 | Aronson, II et al. | 241/199.12 |
| 3,901,484 A * | 8/1975 | Ernster | 241/282.2 |
| 4,120,616 A * | 10/1978 | Dwyer et al. | 417/373 |
| 4,285,473 A * | 8/1981 | Williams | 241/37.5 |
| 4,892,413 A * | 1/1990 | Vats | 366/349 |
| 5,085,375 A * | 2/1992 | Haworth | 241/55 |
| 5,273,358 A * | 12/1993 | Byrne et al. | 366/205 |
| 5,297,475 A * | 3/1994 | Borger et al. | 99/348 |
| 6,069,423 A * | 5/2000 | Miller et al. | 310/51 |
| 6,336,603 B1 * | 1/2002 | Karkos et al. | 241/101.2 |
| 6,499,873 B1 * | 12/2002 | Chen | 366/197 |
| 6,595,113 B1 * | 7/2003 | Chang | 99/337 |
| 6,680,551 B2 * | 1/2004 | Bates et al. | 310/62 |
| 7,320,542 B2 | 1/2008 | Tai | |
| 8,087,603 B2 * | 1/2012 | Kolar et al. | 241/285.3 |
| 2003/0076739 A1 * | 4/2003 | Brezovnik et al. | 366/349 |
| 2010/0014380 A1 * | 1/2010 | Kolar et al. | 366/347 |
| 2010/0294142 A1 * | 11/2010 | Durris et al. | 99/537 |
| 2011/0108647 A1 * | 5/2011 | Buzian | 241/98 |

OTHER PUBLICATIONS

International Search Report for PCT/US2012/037926 dated Jul. 19, 2012.

* cited by examiner

*Primary Examiner* — David Sorkin
*Assistant Examiner* — Abbas Rashid
(74) *Attorney, Agent, or Firm* — McDonald Hopkins LLC

(57) ABSTRACT

A blender base is generally described. The blender base includes a base frame. An outer shell may be connected to the base frame. A motor housing is supported by the base frame and positioned inside the outer shell. The motor housing is isolated from direct connection with the outer shell to reduce the transfer of noise and vibration from the motor to the outer shell.

26 Claims, 10 Drawing Sheets

BLENDER BASE

BACKGROUND

Loud noise in both household and commercial blenders has been an issue. Blenders may be designed for home use or for commercial use, and typically perform a mixing function for a drink or other food. When utilized in businesses, such as restaurants or coffee shops, the blender is often positioned adjacent to a serving or dining area so that the food or drinks may be prepared as ordered. When so placed, the sound emitted by the blender can disturb or distract customers as it processes or mixes a drink.

The motor is a direct source of noise when in operation, and also is an indirect source of noise due to the vibration it creates within the base. The vibrations created by the operating motor cause the base itself, and other components within the base, to vibrate, thereby generating additional noise. Further, noise and vibration from the motor may be translated to other components of the base, such as the shell or enclosure. Vibrations translated from the motor to the base shell cause the shell to act as a sound amplifier.

Furthermore, the cooling air flowing through the blender base can amplify the loud motor sound. Cooling air is typically provided to the motor within the base to prevent overheating. This cooling air may be drawn in through an air inlet and forced out of the base through an air exhaust. The airflow exiting the base of the food processor carries the loud noise created during operation of the blender to the exterior of the base, effectively amplifying the sound.

Various methods have been used to reduce the sound created by a blender. One such method includes providing a sound enclosure around the container of the food processor to contain the noise created by the mixing being performed. This method of noise reduction, however, fails to address the noise created by the blender. Also, previous attempts have been made to provide a baffle within the base to suppress the noise carried by the cooling airflow. These attempts, however, have been ineffective for various reasons, including complexity of the design and difficulty in manufacturing.

Therefore, the need exists for addressing the root issue: reducing blender base noise within the base itself.

SUMMARY

A blender base having one or more design components to reduce noise is generally described. The blender base includes a base frame. A motor housing is supported by the base frame. An outer shell may be connected to the base frame. The motor housing is isolated from any direct connection with the outer shell to reduce or even eliminate the transfer of noise and vibration from the motor to the shell.

In an embodiment the base frame includes one or more inlet ports, one or more exhaust ports, a base plate and a fan chamber. The base plate seals the air gap created between the base frame and a supporting surface. The exhaust ports may lead to air passages in the base frame. The air passages provide a pathway for exhaust air from the fan chamber to exit the blender base through the exhaust ports.

DESCRIPTION OF THE DRAWINGS

Objects and advantages together with the operation of the invention may be better understood by reference to the following detailed description taken in connection with the following illustrations, wherein.

DETAILED DESCRIPTION

The present invention relates to a blender base 10 as shown in FIGS. 1-9. The blender base 10 is generally configured to support a blender container (not shown) and facilitate rotation of a blending blade on the blender container.

The blender base 10 may include a base frame 12. The base frame 12 may be any appropriate shape, size or configuration, such as generally rectangular or square. The base frame 12 may be made of any appropriate material, such as molded plastic or the like. The base frame 12 may include features designed to facilitate airflow through the blender base 10. For example, the base frame 12 may include hollow portions, ridged portions and openings, as will be described in further detail, to create air gaps and pathways to direct the flow of air through the blender base 10.

The base frame 12 may include one or more feet 14. The feet 14 may be any appropriate size or shape and may be located at any appropriate position about the base frame 12, such as disposed about the bottom surface of the base frame 12. The feet 14 may engage a surface that supports the blender base 10 to stabilize and level the base frame 12. The feet may be composed of any appropriate material, such as rubber.

Figure 6:
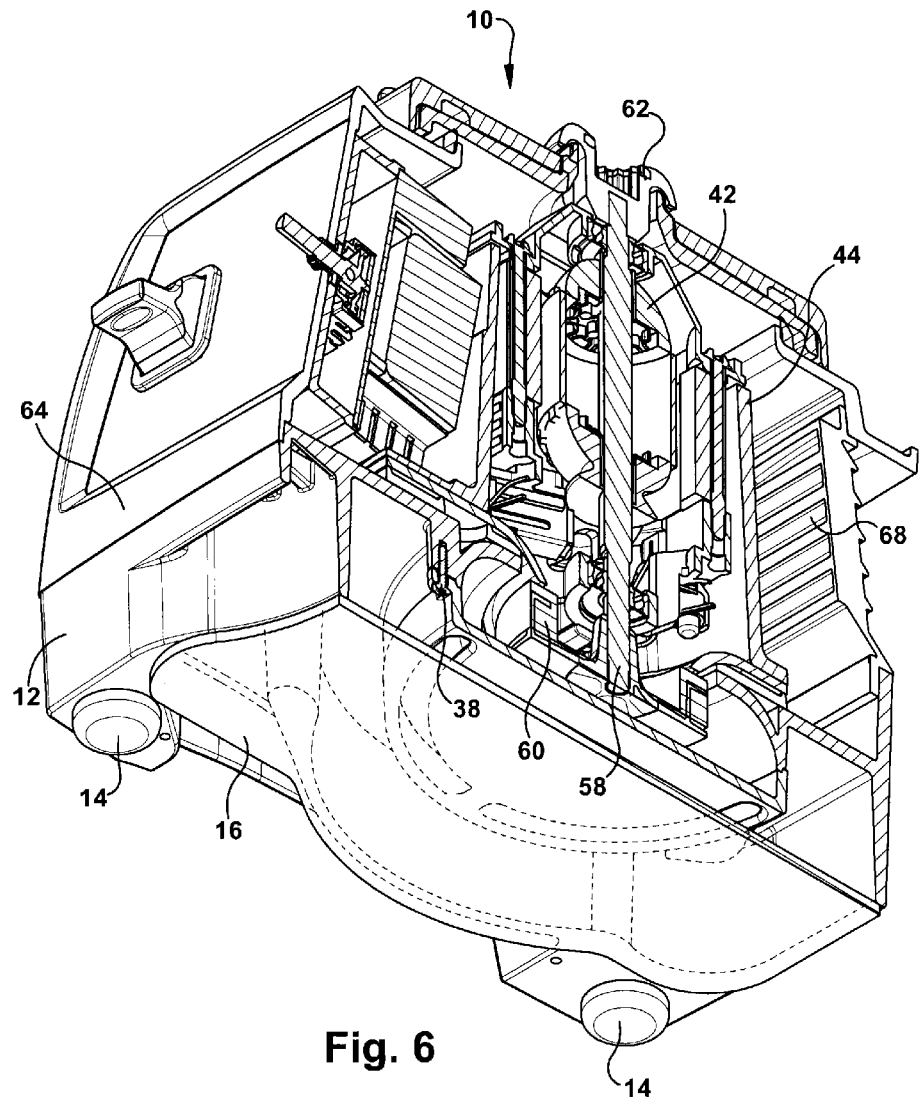
FIG. 6 illustrates a first perspective cross sectional view of a blender base.
Figure 7:
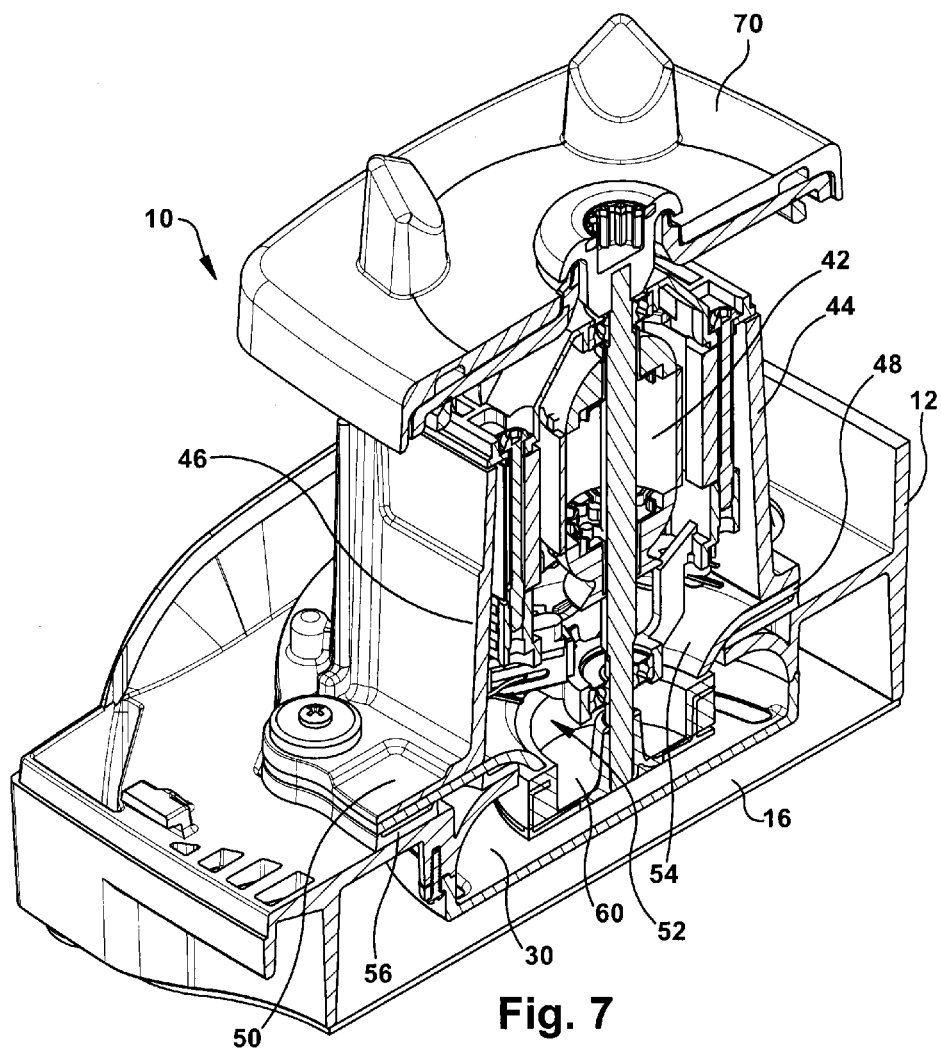
FIG. 7 illustrates a second perspective cross sectional view of a blender base.

A base frame 12 may include a base plate 16. (FIGS. 6-7.) The base plate 16 may be any appropriate shape, size or configuration, such as rectangular, square or designed to generally correspond to the shape of the base frame 12. The base plate 16 may connect to a bottom portion of the base frame 12 to seal the air gap between the surface supporting the blender base 10 and an interior portion of the base frame 12. The base plate 16 may be positioned inside of the feet 14 to allow the feet 14 to directly contact the supporting surface while still sealing the air gap.

Figure 5:
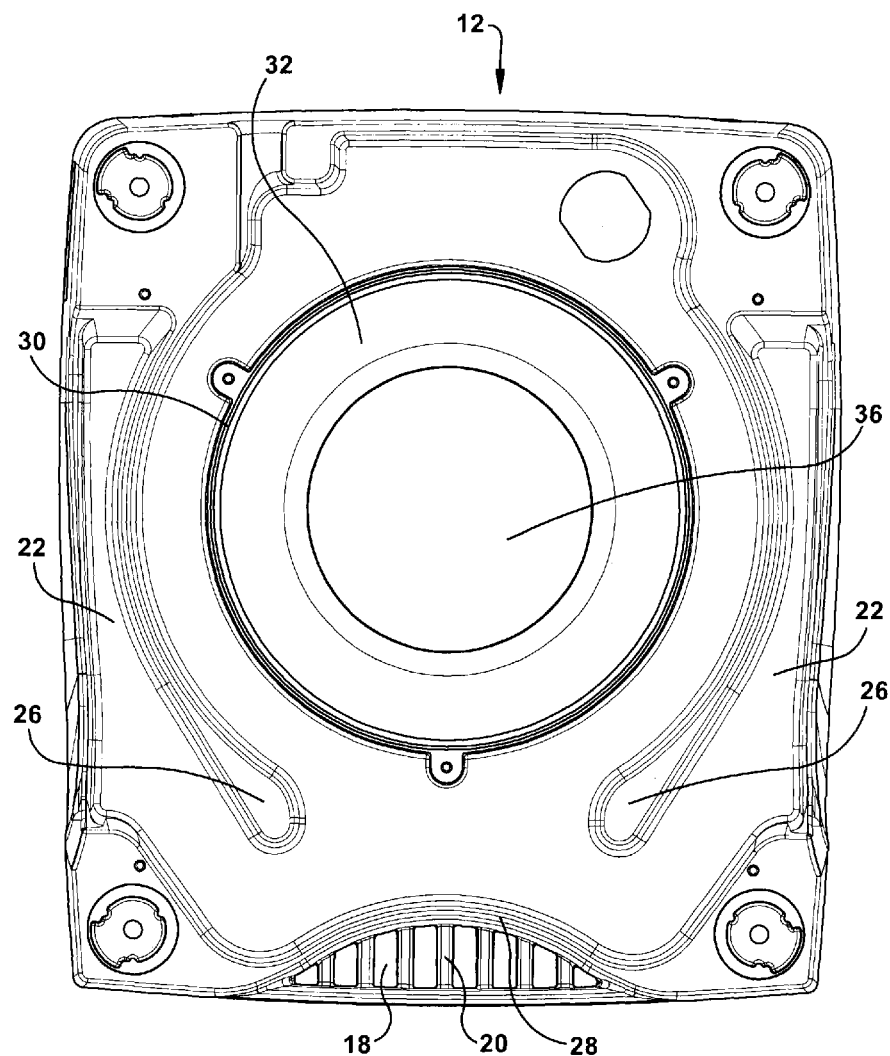
FIG. 5 illustrates a bottom view of a base frame.
Figure 8:
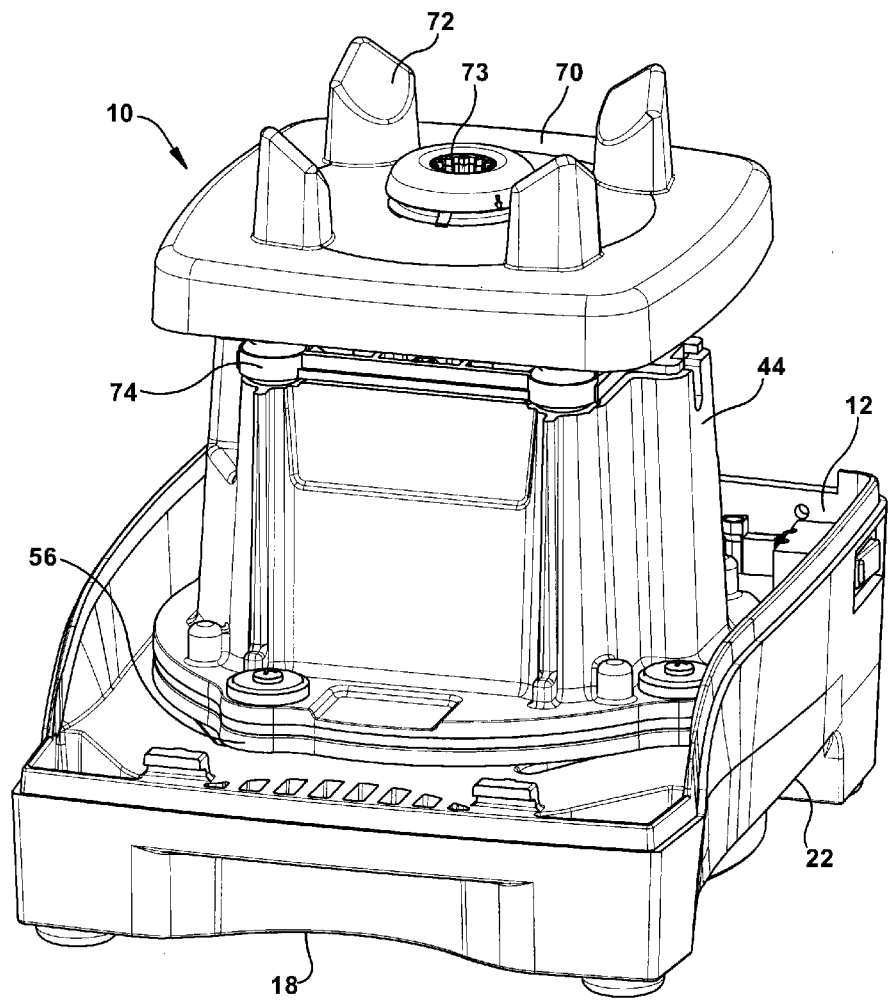
FIG. 8 illustrates a top perspective view of a base frame.
Figure 9:
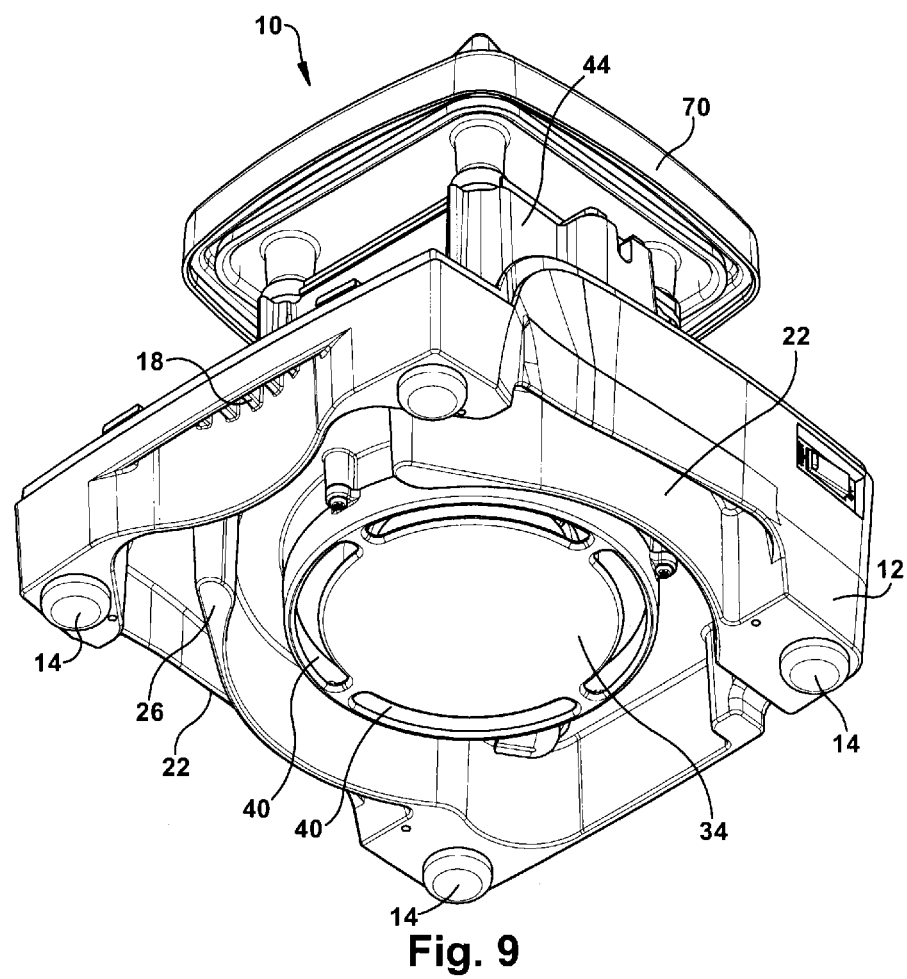
FIG. 9 illustrates a bottom perspective view of a base frame.
Figure 10:
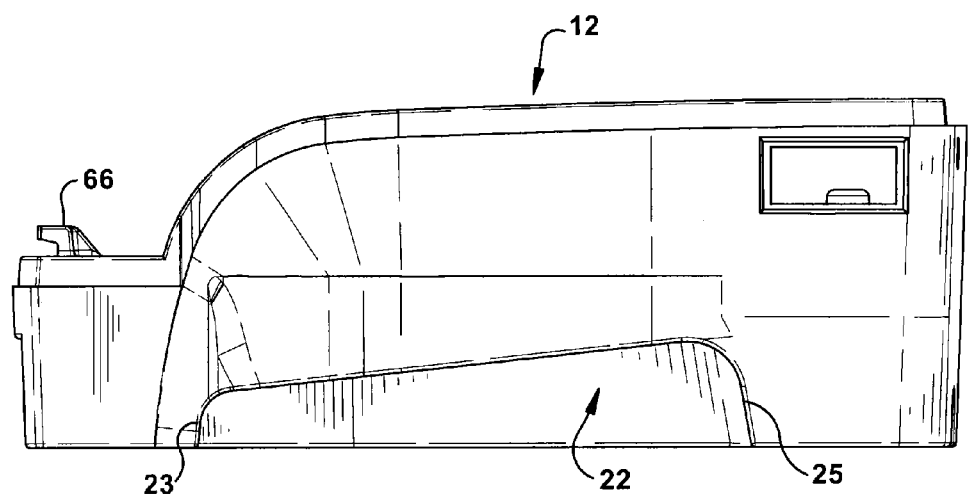
FIG. 10 is a side view of the blender base frame.

The base frame 12 may include an air inlet port 18 to receive air into the blender base 10. (FIGS. 8-9.) The inlet port 18 may be any appropriate size or shape and may be located at any appropriate position on the base frame 12. For example, the base frame 12 may include a single inlet port 18 located at a rear portion of the base frame 12. In an embodiment, the inlet port 18 may be centered along a rear side of a four-sided base frame 12. (FIG. 5). The inlet port 18 may include one or more apertures. The aperture or apertures may be covered by a grill 20 to prevent large debris from entering the blender base 10. The inlet port 18 may allow ambient air to enter the blender base 10 and cool internal components.

Figure 4:
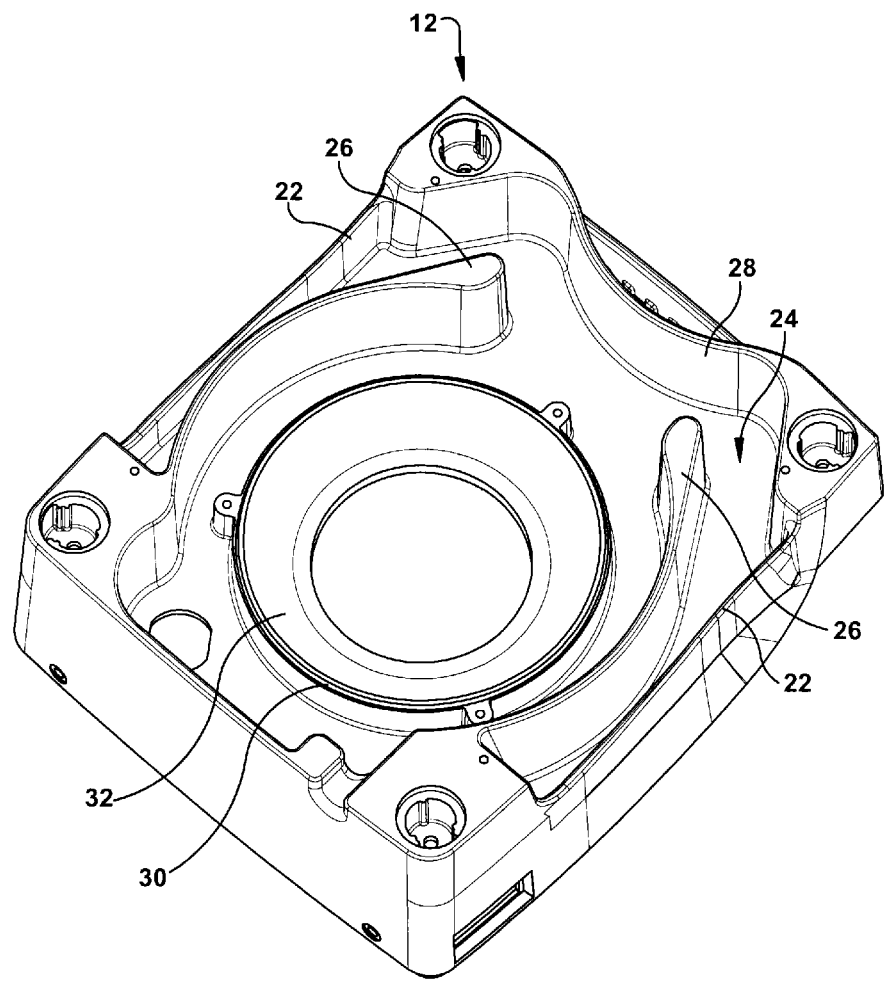
FIG. 4 illustrates a bottom perspective view of a base frame.

The base frame 12 may include one or more diffusers 22. (FIGS. 4-5.) The diffusers 22 may be any appropriate size or shape and may be located at any appropriate position on the base frame 12. For example, the base frame 12 may include two or more exhaust ports or diffusers 22. A first diffuser 22 may be located on a first side of the base frame 12 and a second diffuser 22 may be located on a second side of the base frame 12 opposite the first side.

Each diffuser 22 may comprise an opening leading to an air passageway 24. The diffuser opening may extend between a first end 23 and a second end 25. The diffuser 22 may be slanted in shape to facilitate diffusing of the exhaust air. For example, a first end 23 of the diffuser 22 positioned nearest front of the base frame 12 may be smaller than the second end 25 to form a slanted shape. The exiting exhaust air may reach the first end 23 before it reaches the second end 25 of the exhaust port. The slanted shape of the diffuser 22 helps to diffuse the exhaust pressure and reduces noise and vibration.

The passageways 24 may be defined on one side by a curved wall 26 and on the other side by a back wall 28 of the base frame 12. The passageways 24 may be any appropriate size or shape. In an embodiment, the passageways 24 may extend generally linearly into the base frame 12. The passageways 24 may intersect at an interior point in the base frame 12 and may further form a circular pathway about other portions of the base frame 12.

Figure 1:
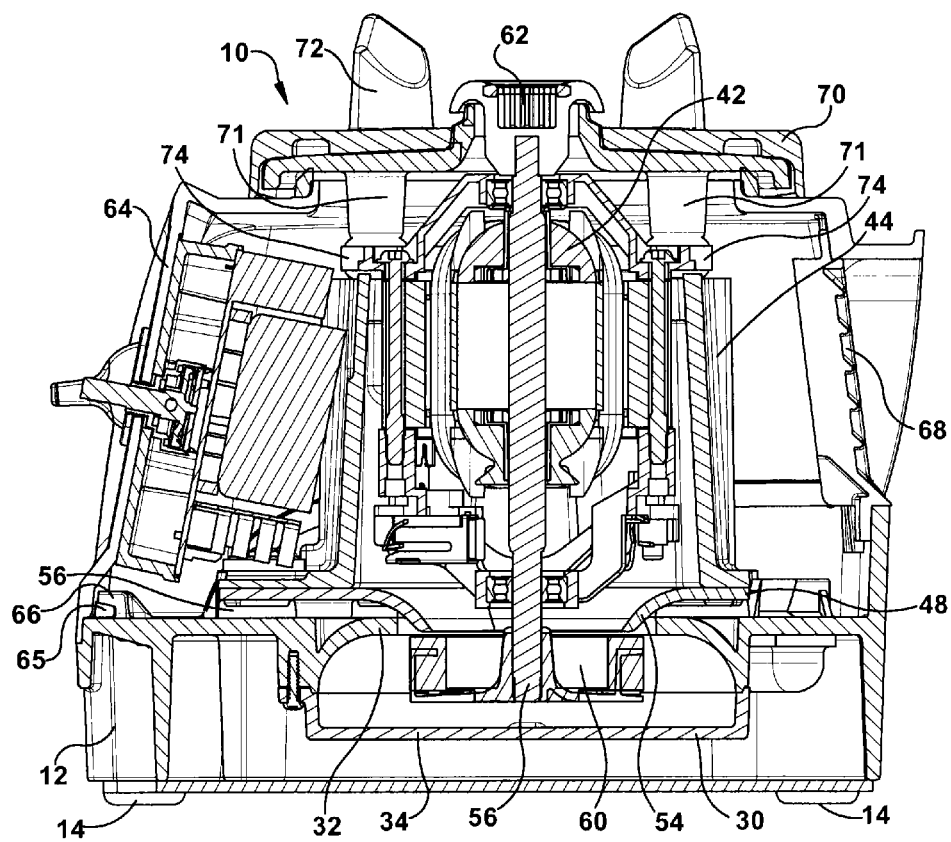
FIG. 1 illustrates a cross sectional view of a blender base.
Figure 2:
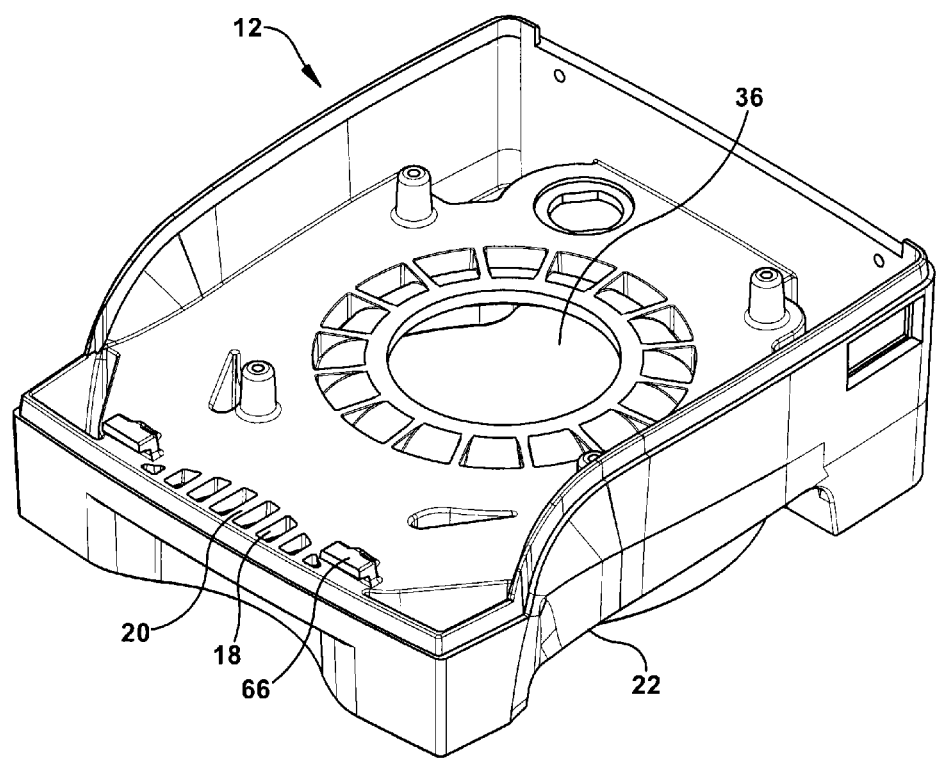
FIG. 2 illustrates a top perspective view of a base frame.
Figure 3:
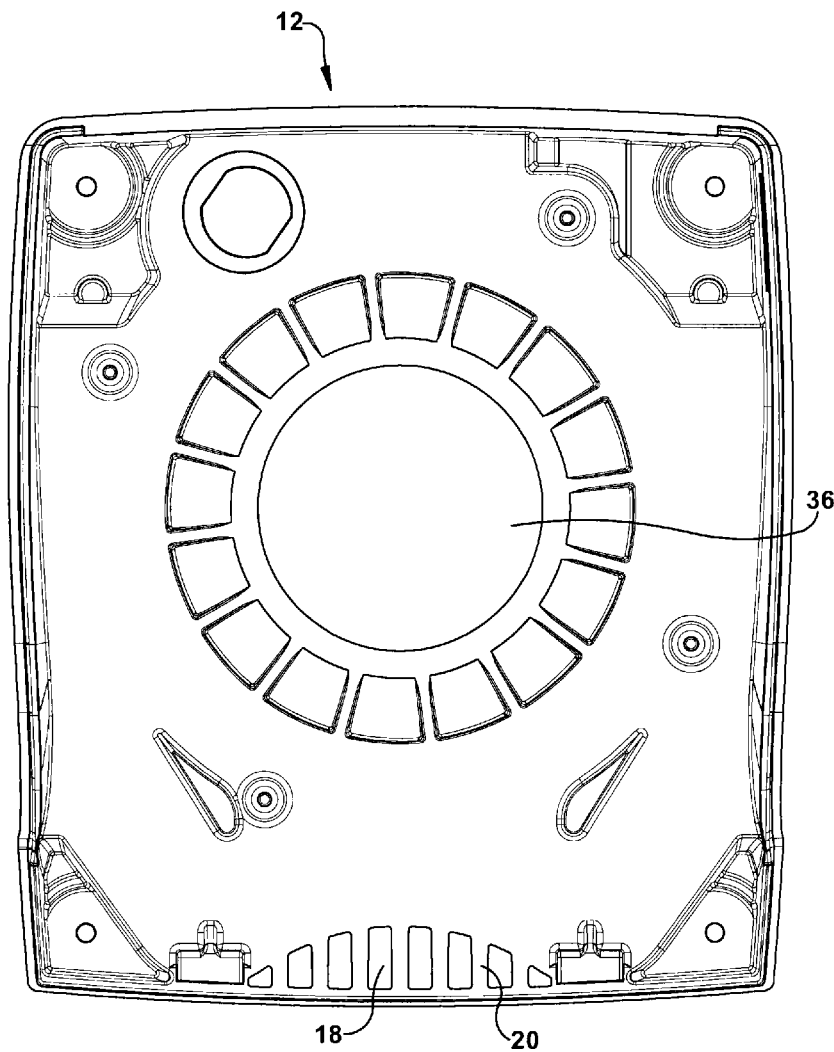
FIG. 3 illustrates a top view of a base frame.

The base frame 12 may include a fan chamber 30. (FIGS. 1 and 7.) The fan chamber 30 may be any appropriate size or shape, such as generally cylindrical and configured to house a fan. The fan chamber 30 may be located at any appropriate position on the base frame 12, such as generally centered on the base frame 12. The fan chamber 30 may comprise a top wall 32, a bottom wall 34 and a fan opening 36. The top wall 32 generally may be curved to form an interior concave surface about the upper perimeter of the fan chamber 30. The top wall 32 may be integrally formed with the base frame 12. The fan opening 36 may be located in the top wall 32 to provide access between the fan chamber 30 and other portions of the blender base 10. The fan opening 36 may be any appropriate size or shape, such as circular, and may be located at any appropriate position on the top wall 32, such as centered on the top wall 32.

The bottom wall 34 may form the bottom surface of the fan chamber 30. The bottom wall 34 may be any appropriate size and shape, such as generally circular and configured to engage the top wall 32. The bottom wall 34 may be removable from the fan chamber 30 to provide service access to the fan chamber 30. For example, the bottom wall 34 may be connected to the top wall by one or more fasteners 38, such as a screw, or by any other connecting means known in the art. It will be appreciated, however, that the bottom wall 34 may be integrally formed with the top wall 32 or otherwise connected thereto.

The bottom wall 34 may include one or more fan vents 40. The fan vents 40 may be any appropriate size or shape, such as arced or semi-circular openings, and may be located at any appropriate position on the bottom wall 34, such as disposed about the perimeter of the bottom wall 34. The fan vents 40 may allow air to pass between the fan chamber 30 and other portions of the base frame 12, such as the air passageways 24 and diffusers 22.

The blender base 10 may include a motor 42 generally disposed inside a motor housing 44. The motor housing 44 may be located at any appropriate position, such as generally above the base frame 12. The housing 44 may be generally aligned with the fan chamber 30. The motor housing 44 may comprise a plurality of side walls 46. The side walls 46 may be any appropriate size or shape, such as generally rectangular. The side walls 46 may connect to form an interior volume and may surround the motor 42 and any related motor components.

The motor housing 44 may include a choke plate or floor plate 48. The floor plate 48 may be any appropriate size or shape and may connect to a bottom portion of the side walls 46. For example, the side walls 46 may include a flanged portion 50 that may engage the floor plate 48. The floor plate 48 may include an opening 52. The opening 52 may be any appropriate size and shape, such as square or circular. The opening 52 may be generally aligned with the fan opening 36 to provide access between the interior of the motor housing 44 and the fan chamber 30.

The floor plate 48 may be configured to facilitate airflow between the motor housing 44 and the fan chamber 30. To that end, the floor plate 48 may include a tapered surface 54 proximate to the opening 52. The tapered surface 54 may be curved or slanted toward the fan chamber 30. The tapered surface 54 may extend up to or into the fan opening 36.

The blender base 10 may include a bottom gasket 56. The bottom gasket 56 may be any appropriate size and shape, and may be located at any appropriate position, such as between the motor housing 44 and the base frame 12. The bottom gasket 56 may absorb noise and vibration emitted by the motor 42 and motor housing 44 and may isolate the motor housing 44 from the base frame 12.

The motor 42 may be positioned within the motor housing 44. The motor 42 may be any type of motor known in the industry, such as an electric AC motor. The motor 42 may include a shaft 58. The shaft 58 may be any appropriate size or shape, as is known in the industry. The motor 42 may rotate the shaft 58 to facilitate rotation of other components of the blender base 10.

A fan 60 may be connected to the shaft 58, such as at the end of the shaft 58. The fan 60 may be positioned within the fan chamber 30. The fan 60 may be rotated by the motor 42 to facilitate air flow through the blender base 10, thereby cooling the motor 42 and other related components. The fan may be positioned within the fan chamber 30 to abut the tapered portion 54 of the floor plate 48. (FIG. 1).

A shaft coupler 62 may be connected to the shaft 58. The shaft coupler 62 may be connected at any appropriate position along the shaft 58, such as at an end of the shaft opposite the fan 60. The shaft coupler 62 may be connectable to a blade axis of a blender container. For example, the shaft coupler 62 may include an opening to receive or otherwise connect to the blade axis of a blender container. The shaft coupler 62 may be driven by the shaft 58 to rotate the blade axis of the blender container, thereby facilitating rotation of the blender blade.

The blender base 10 may include an outer shell 64 generally disposed about its outer surface. The outer shell 64 may be composed of any appropriate material, such as molded plastic or the like. The outer shell 64 may be any appropriate size or shape, such as generally concave forming a hollow interior. The outer shell 64 may surround and protect the working parts of the blender base 10.

The outer shell 64 may be supported by the base frame 12. For example, the base frame 12 may include a clasp portion 66. The clasp portion 66 may be positioned at or near the perimeter of the base frame 12. The clasp portion 66 may comprise a hooked or angled portion extending above the surface of the base frame 12. A latch portion 65 of the outer shell 64 may be configured to engage the clasp portion 66 to support and maintain the outer shell 64 at a desired position.

The outer shell 64 may include an air vent 68. The air vent 68 may comprise one or more slots or openings in the outer shell 64. The air vent 68 may be any appropriate size and shape. The air vent 68 may allow air to flow between the interior of the outer shell 64 and the exterior environment.

The outer shell 64 may include a pedestal 70. The pedestal 70 may be any appropriate size or shape, such as generally square. The pedestal 70 may be configured to receive and support a blender container. For example, the pedestal 70 may include one or more protrusions 72 to engage and position a portion of the blender container. The pedestal 70 may include a central opening 73. The shaft coupler 62 may protrude from the central opening 73.

The motor housing 44 may be isolated from the outer shell 64 and the base frame 12 to reduce noise and vibration of the blender base 10. The motor 42 may emit vibrations and other noise. This noise and vibration may be amplified by the hollow opening provided by the outer shell 64 or the open spaces provided by the base frame 12. Therefore, reducing the amount of vibration and noise that is transferred from the motor 42 to the outer shell 64 or the base frame 12 may greatly reduce the overall noise output of the blender base 10. To that end, the motor 42 and motor housing 44 may be isolated from direct connection with the outer shell 64 and base frame 12 to reduce amplification of noise and vibration.

In an embodiment, the motor housing 44 is isolated from any direct connection with the outer shell 64 and the pedestal 70. The pedestal 70 may include one or more posts 71 to interconnect to a portion of the motor housing 44. For example, the pedestal 70 may include four posts 71 arranged to be supported by an upper portion of the motor housing 44. The posts 71 may provide the only connection between the pedestal 70 and the motor housing 44. One or more upper gaskets 74 may be positioned about the motor housing 44. The upper gaskets 74 may comprise a grommet positioned between the post 71 and a corresponding connecting portion of the motor housing 44. The upper gaskets 74 may be any appropriate size or shape and may be composed of any appropriate material, such as rubber. The upper gasket 74 may absorb noise and vibration to reduce the transfer of noise and vibration from the motor 42 and motor housing 44 to the outer shell 64.

Noise and vibration may be transferred through components such as fasteners, screws and bolts. In an embodiment, the blender base 10 may be configured without any fasteners, screws, bolts or other components that directly interconnect the outer shell 64 or pedestal 70 to the motor housing 44. Thus, the motor housing 44 may be isolated from any direct connection with the outer shell 64. Further, the motor housing 44 may be isolated from any direct interconnection with the outer shell 64 or pedestal 70 other than through the upper gaskets 74 or bottom gasket 56.

The blender base 10 may include a control panel (not shown). The control panel may allow a user to selectively control the motor 42, such as turning the motor 42 on and off and selecting motor speeds. The control panel may include a display, on/off switch, speed controls, and other controls necessary to control the motor functions.

In operation, a user may turn on the blender base to initiate rotation of the motor 42. The motor may rotate the shaft 58, which in turn may rotate the shaft coupler 62 and the fan 60. The fan 60 may draw air into the blender base 10, such as through the inlet port 18. Air may flow through the interior of the blender base 10 and through the motor housing 44 to cool the motor 42 and motor related components. The fan chamber 30 may receive air from the motor housing 44 and exhaust the air through the base frame 12. For example, the fan 60 may force air out of the fan chamber 30 through fan vents 40 in the bottom wall 34. The exhaust air may flow through around the curved walls 26 in the base frame 12 and through the passageways 24 to the diffusers 22.

The embodiments of the invention have been described above and, modifications and alternations will occur to others upon reading and understanding this specification. The claims as follows are intended to include all modifications and alterations insofar as they come within the scope of the claims or the equivalent thereof.

What is claimed is:

1. A blender base comprising:
   a base frame;
   a motor housing supported above said base frame;
   a pedestal supported by said motor housing and configured to receive a blender container thereon, said pedestal having a center point and connected to said motor housing at one or more motor housing connection points;
   an outer shell connected to said base frame and connected to said pedestal at one or more outer shell connection points; and
   wherein the distance between said pedestal center point and said one or more outer shell connection points is greater than the distance between said pedestal center point and said one or more motor housing connection points.

2. The blender base of claim 1, wherein said motor housing is isolated from direct contact with said base frame.

3. The blender base of claim 1 wherein said motor housing is isolated from direct contact with said pedestal.

4. The blender base of claim 3 further comprising an upper gasket positioned between said motor housing and said pedestal.

5. The blender base of claim 1 further comprising a bottom gasket positioned between said motor housing and said base frame.

6. The blender base of claim 1, wherein said motor housing is isolated from direct interconnection with the base frame.

7. A blender base comprising:
   a base frame comprising:
     an inlet port;
     one or more outlet ports;
     a base plate;
     a fan chamber having a fan therein; and
     a wall positioned above said fan chamber, said wall including an opening with a diameter, wherein said diameter of said opening is decreasing towards said fan chamber;
   a motor housing supported by said base frame;
   a motor disposed within said motor housing;
   an outer shell connected to said base frame; and
   a pedestal having an opening for a shaft coupler that is configured to extend from the motor.

8. The blender base of claim 7, wherein said fan chamber is cylindrical.

9. The blender base of claim 7, wherein said fan chamber comprises a bottom plate.

10. The blender base of claim 9, wherein said bottom plate is removably connected to said fan chamber.

11. The blender base of claim 9 further comprising a fan vent in said bottom plate.

12. The blender base of claim 7, wherein said base plate is configured to seal an air gap formed between the base frame and a surface supporting the blender base.

13. The blender base of claim 7, wherein said base frame comprises a first exhaust port connected to a first air passageway and a second exhaust port connected to a second air passageway.

14. The blender base of claim 13, wherein said first and second air passageways are defined by a first and second curved wall and a back wall of said base frame.

15. The blender base of claim 7 further comprising a fan positioned within said fan chamber.

16. The blender base of claim 7, wherein a bottom wall of said motor housing includes a flanged portion extending into an opening in said fan chamber.

17. The blender base of claim 16, wherein said flanged portion is curved.

18. The blender base of claim 7 further comprising a shaft coupler connected to a shaft.

19. The blender base of claim 1, wherein the outer shell is directly connected to said base frame.

20. The blender base of claim 1, wherein the outer shell is directly connected to said pedestal.

21. The blender base of claim 1, wherein the outer shell is isolated from direct connection with the motor housing.

22. A blender base comprising:
   a base frame comprising:
      an inlet port;
      one or more outlet ports;
      a base plate;
      a fan chamber having a fan therein, said fan chamber comprising a bottom plate having an area; and
      a wall positioned above said fan chamber, said wall including an opening with a diameter, said diameter of said opening is decreasing towards said fan chamber;
   a motor housing supported by said base frame;
   a motor disposed within said motor housing; and
   an outer shell connected to said base frame, the outer shell including a pedestal having an opening for a shaft coupler that is configured to protrude from the opening, the pedestal configured to receive a blender container thereon.

23. The blender base of claim 22, wherein a portion of said wall is curved toward said fan chamber.

24. The blender base of claim 22, wherein said bottom plate is removably connected to said fan chamber.

25. The blender base of claim 22 further comprising a fan vent in said bottom plate.

26. The blender base of claim 22, wherein said base plate is configured to seal an air gap formed between the base frame and a surface supporting the blender base.

* * * * *